US011935444B2

(12) United States Patent
Hong et al.

(10) Patent No.: US 11,935,444 B2
(45) Date of Patent: Mar. 19, 2024

(54) DETECTION CIRCUIT, DRIVING CIRCUIT, AND DISPLAY PANEL AND DRIVING METHOD THEREFOR

(71) Applicants: Hefei BOE Optoelectronics Technology Co., Ltd., Anhui (CN); BOE Technology Group Co., Ltd., Beijing (CN)

(72) Inventors: Jun Hong, Beijing (CN); Fei Xu, Beijing (CN); Jingyong Li, Beijing (CN); Yanbin Wang, Beijing (CN); Wenhong Tian, Beijing (CN); Lei Gong, Beijing (CN)

(73) Assignees: HEFEI BOE OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/016,688

(22) PCT Filed: Nov. 17, 2021

(86) PCT No.: PCT/CN2021/131318
§ 371 (c)(1),
(2) Date: Jan. 18, 2023

(87) PCT Pub. No.: WO2022/166303
PCT Pub. Date: Aug. 11, 2022

(65) Prior Publication Data
US 2023/0282141 A1 Sep. 7, 2023

(30) Foreign Application Priority Data
Feb. 7, 2021 (CN) ........................ 202110167917.0

(51) Int. Cl.
*G09G 3/00* (2006.01)
*G09G 3/3233* (2016.01)

(52) U.S. Cl.
CPC ........... *G09G 3/006* (2013.01); *G09G 3/3233* (2013.01); *G09G 2300/0842* (2013.01);
(Continued)

(58) Field of Classification Search
CPC ................. G09G 3/006; G09G 3/3233; G09G 2300/0842; G09G 2320/0242; G09G 2320/041; G09G 2330/08; G09G 2330/12
See application file for complete search history.

(56) References Cited

U.S. PATENT DOCUMENTS 9,728,132 B2 8/2017 Wu et al.
10,535,299 B2 1/2020 Ling et al.
(Continued)

FOREIGN PATENT DOCUMENTS

CN 104680982 A 6/2015
CN 107886897 A 4/2018
(Continued)

OTHER PUBLICATIONS

International Search Report and Written Opinion dated Feb. 8, 2022, in corresponding International Application No. PCT/CN2021/131318.

(Continued)

*Primary Examiner* — Stephen G Sherman
(74) *Attorney, Agent, or Firm* — XSENSUS LLP

(57) ABSTRACT

A detection circuit, a driving circuit, and a display panel and a driving method therefor are provided. The detection circuit includes an acquisition circuit and a processing circuit. The acquisition circuit includes a test transistor and an energy storage element, where, for the test transistor, a control end is configured to be coupled to the data signal terminal, a first
(Continued)

end is configured to be written with a detection signal, and a second end is coupled to the energy storage element; and a structural characteristic of the test transistor is identical to a structural characteristic of the driving transistor. The processing circuit is coupled to the second end of the test transistor, and configured to detect a voltage at the second end of the test transistor as a detection voltage and regulate the data signal according to the detection voltage.

18 Claims, 4 Drawing Sheets

(52) U.S. Cl.
CPC . *G09G 2320/0242* (2013.01); *G09G 2330/08* (2013.01); *G09G 2330/12* (2013.01)

(56) References Cited

U.S. PATENT DOCUMENTS

| | | | | |
|---|---|---|---|---|
| 2011/0122118 | A1* | 5/2011 | Kotani | G09G 3/3233 345/211 |
| 2017/0039941 | A1 | 2/2017 | Wu et al. | |
| 2017/0294163 | A1 | 10/2017 | Wu et al. | |
| 2019/0295463 | A1 | 9/2019 | Ling et al. | |
| 2021/0327354 | A1 | 10/2021 | Chen et al. | |

FOREIGN PATENT DOCUMENTS

| | | | |
|---|---|---|---|
| CN | 108648696 | A | 10/2018 |
| CN | 109119025 | A | 1/2019 |
| CN | 109377944 | A | 2/2019 |
| CN | 110444159 | A | 11/2019 |
| CN | 110875009 | A | 3/2020 |
| CN | 107886897 | B | 6/2020 |
| CN | 111583855 | A | 8/2020 |
| CN | 111599308 | A | 8/2020 |
| CN | 112951132 | A | 6/2021 |
| EP | 3844740 | A1 | 7/2021 |
| KR | 100846969 | B1 | 7/2008 |
| WO | 2019242369 | A1 | 12/2019 |
| WO | 2020042522 | A1 | 3/2020 |
| WO | 2020182017 | A1 | 9/2020 |

OTHER PUBLICATIONS

Chinese Office Action dated Jan. 4, 2022, in corresponding Chinese Patent Application 202110167917.0.

Chinese Notification to Grant dated Jun. 6, 2022, in corresponding Chinese Patent Application No. 202110167917.0.

* cited by examiner

DETECTION CIRCUIT, DRIVING CIRCUIT, AND DISPLAY PANEL AND DRIVING METHOD THEREFOR

CROSS-REFERENCE TO RELATED APPLICATIONS

This disclosure is the U.S. National phase application of International Application No. PCT/CN2021/131318, filed on Nov. 17, 2021 and claims the priority of Chinese Patent Application No. 202110167917.0, filed on Feb. 7, 2021, and entitled "Detection circuit, driving circuit, display panel and driving method thereof," the entire contents of each are incorporated herein by reference in their entireties.

TECHNICAL FIELD

The disclosure relates to the field of display technologies, and in particular, to a detection circuit, a driving circuit, a display panel, and a driving method for the display panel.

BACKGROUND

At present, Organic Light-Emitting Diode (OLED) display panels have been widely used in various electronic devices such as mobile phones, among which silicon-based OLED display panels have earned greater consideration due to their simple structure and fast response time. However, the OLED display panel is prone to color cast or even a black screen during use, which affects the display quality, especially for the silicon-based OLED display panel, it is more prone to color cast or even a black screen.

It should be noted that the above information disclosed in the background is merely used to enhance the understanding of the background of the disclosure, and therefore may include information that does not constitute the prior art known to a person of ordinary skill in the art.

SUMMARY

The purpose of the disclosure is to provide a detection circuit, a driving circuit, a display panel and a driving method for the display panel.

According to a first aspect of the disclosure, a detection circuit for a pixel circuit is provided. The pixel circuit includes a driving transistor, and a pixel switching unit connected between a control end of the driving transistor and a data signal terminal, the data signal terminal being configured to provide a data signal. The detection circuit includes:

- an acquisition circuit including a test transistor and an energy storage element, where a control end of the test transistor is configured to be coupled to the data signal terminal, a first end of the test transistor is configured to be written with a detection signal, and a second end of the test transistor is coupled to the energy storage element; and a structural characteristic of the test transistor is identical to and a structural characteristic of the driving transistor;
- a processing circuit coupled to the second end of the test transistor, and configured to detect a voltage at the second end of the test transistor as a detection voltage and regulate the data signal according to the detection voltage.

According to a second aspect of the disclosure, a driving circuit is provided, including:

- a pixel circuit including a driving transistor, and a pixel switching unit connected between a control end of the driving transistor and a data signal terminal, the data signal terminal being configured to provide the data signal; and
- the detection circuit according to the first aspect.

According to a third aspect of the disclosure, a display panel is provided, including the driving circuit according to the second aspect.

According to a fourth aspect of the disclosure, a driving method for a display panel is provided, and the display panel includes:

- a driving circuit including the pixel circuit and the detection circuit according to any one of the preceding embodiments; and
- the driving method includes:
- in a display phase, turning on the pixel switching unit, and turning off the first switching unit;
- in a detection phase, turning off the pixel switching unit and the third switching unit, and turning on the first switching unit and the second switching unit; and
- in a regulation phase, turning on the second switching unit and the third switching unit, and turning off the pixel switching unit and the first switching unit; detecting, by the processing circuit, the voltage at the second end of the test transistor, as a detection voltage, and regulating the data signal according to the detection voltage.

It should be understood that the above general description and the following detailed description are merely illustrative and explanatory, and the disclosure is not limited thereto.

BRIEF DESCRIPTION OF THE DRAWINGS

The accompanying drawings, which are incorporated in and constitute a part of this specification, illustrate embodiments consistent with the disclosure, and explain the principles of the disclosure together with the description. Obviously, the drawings in the following description are merely some embodiments of the disclosure, and for those of ordinary skill in the art, other drawings may also be obtained from these drawings without creative effort.

DETAILED DESCRIPTION

Figure 1:
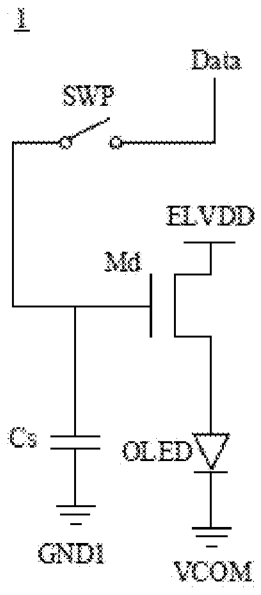
FIG. 1 is a schematic diagram of a pixel circuit according to an embodiment of the disclosure.

Exemplary embodiments will now be described more fully with reference to the accompanying drawings. However, the exemplary embodiments may be implemented in various forms and should not be construed as limited to the embodiments described herein; on the contrary, these embodiments are provided so that this disclosure will be comprehensive and complete, and the concept of these exemplary embodiments will be fully conveyed to those skilled in the art. The same reference numerals in the drawings denote the same or similar structures, and thus their detailed descriptions will be omitted. Furthermore, the drawings are merely schematic diagrams of the disclosure and are not necessarily drawn to scale.

The terms "one", "a/an", "the", "said" and "at least one" are used to indicate the presence of one or more elements/components/etc. The terms "include/comprise" and "have" are used to indicate an open-ended inclusion and mean that there may be additional elements/components/etc. in addition to those listed elements/components/etc. The terms "first", "second" and "third", etc. are used only as markers, not as restrictions on the number of objects.

The transistor according to the embodiments of the disclosure refers to an element which includes at least three terminals, i.e., a gate, a drain and a source. The transistor has a channel region between the drain and the source, and the current may flow through the drain, the channel region, and the source. The channel region refers to a region through which the current mainly flows. The gate may be a control end of the transistor, the drain may be a first end of the transistor and the source may be a second end of the transistor. Alternatively, the first end may be the source and the second end may be the drain. The functions of "source" and "drain" may be interchanged with each other when using transistors with opposite polarities or when the direction of current changes during circuit operation. Therefore, in this disclosure, the first end and the second end of the transistor may be interchanged with each other.

The transistor according to the embodiment of the disclosure may comprise any one of a P-type transistor and an N-type transistor, where the P-type transistor is turned on when the gate is at a low level and turned off when the gate is at a high level, and the N-type transistor is turned on when the gate is at a high level and turned off when the gate is at a low level.

The embodiments of the disclosure provide a detection circuit for a pixel circuit, and both the pixel circuit and the detection circuit are driving circuit of a display panel. The display panel may be an OLED display panel which usually includes light-emitting element array disposed on a driving backplane including the driving circuit, and both the pixel circuit and the detection circuit may be located in the driving backplane.

Taking the Micro OLED display panel which usually has a size of less than 100 microns (for example, less than 50 microns, etc.) as an example, the driving circuit may be integrated onto a silicon substrate to form the driving backplane. The light-emitting element is formed on the driving backplane including the silicon substrate. The material of the silicon substrate may be single crystal silicon or high-purity silicon. The driving circuit may be formed on the silicon substrate by a semiconductor process, for example, an active layer (i.e., a semiconductor layer) of the transistor, a first end and a second end of the transistor are formed in the silicon substrate by a doping process, and an insulating layer is formed by a silicon oxidation process, and a plurality of conductive layers are formed by a sputtering process. The driving circuit may include a plurality of pixel circuits, each of which is connected to each of the light emitting elements correspondingly.

As shown in FIG. 1, in the embodiments of the disclosure, the pixel circuit 1 may be configured to drive a light-emitting element OLED to emit light, and the pixel circuit 1 may be nTmC (n, m are positive integers) pixel circuit such as 2T1C, 4T2C, 6T1C or 7T1C, the structure of which is not specifically limited thereto as long as it is able to drive the light-emitting element OLED to emit light. Taking the pixel circuit of 2T1C structure as an example, the pixel circuit 1 may include a driving transistor Md and a pixel switching unit SWp, where the pixel switching unit SWp is connected between a control end of the driving transistor Md and a data signal terminal Data, and a first end of the driving transistor Md is connected to a first power supply terminal ELVDD, and a second end of the driving transistor Md is connected to a second power supply terminal VCOM.

In addition, the pixel circuit 1 may further include a storage capacitor Cs connected between the control end of the driving transistor Md and a first potential terminal GND1.

The data signal terminal Data is configured to provide one or more data signals. The first power terminal ELVDD is configured to provide one or more first power signals. The second power terminal VCOM is configured to provide one or more second power signals. The first potential terminal GND1 may be configured to provide a fixed potential, for example, the first potential terminal GND1 may be grounded. When displaying an image, the pixel switching unit SWp may be turned on, a data signal is input by the data signal terminal Data to the control end of the driving transistor Md, and the storage capacitor Cs is charged. A stable voltage may be provided to the control end of the driving transistor Md via the storage capacitor Cs, by which the driving transistor Md generates a current, and thus the light-emitting element OLED emits light.

Here, the pixel switching unit SWp may be a transmission gate, which may be formed of one PMOS transistor and one NMOS transistor connected in parallel, that is, the source of the PMOS transistor is connected to the source of the NMOS transistor, and the drain of the PMOS transistor is connected to the NMOS transistor. By controlling the signals input to the source of the PMOS transistor and the drain of the NMOS transistor, conduction between the source and drain of the transmission gate may be turned on or off. The detailed working principle of the transmission gate will not be described in detail here. Of course, the pixel switching unit SWp may also adopt other switching structures.

During operation, the ambient temperature of the environment where the driving transistor Md is located is too high or too low, that is, the temperature exceeds the threshold range, which will cause a large deviation of the threshold voltage Vth of the driving transistor Md, leading to color cast or even a black screen when driving the light-emitting element OLED with the previously debugged data signal. For example, the threshold range may from −20° C. to 60° C. If the ambient temperature is within the threshold range, the deviation of the threshold voltage Vth is small, and the influence on the display quality may be ignored. However, when the temperature is lower than −20° C. or higher than 60° C., that is, beyond the threshold range, the deviation of the threshold voltage Vth will be large, and if the previously debugged data signal is still used, it is difficult to ensure a normal display quality.

Figure 2:
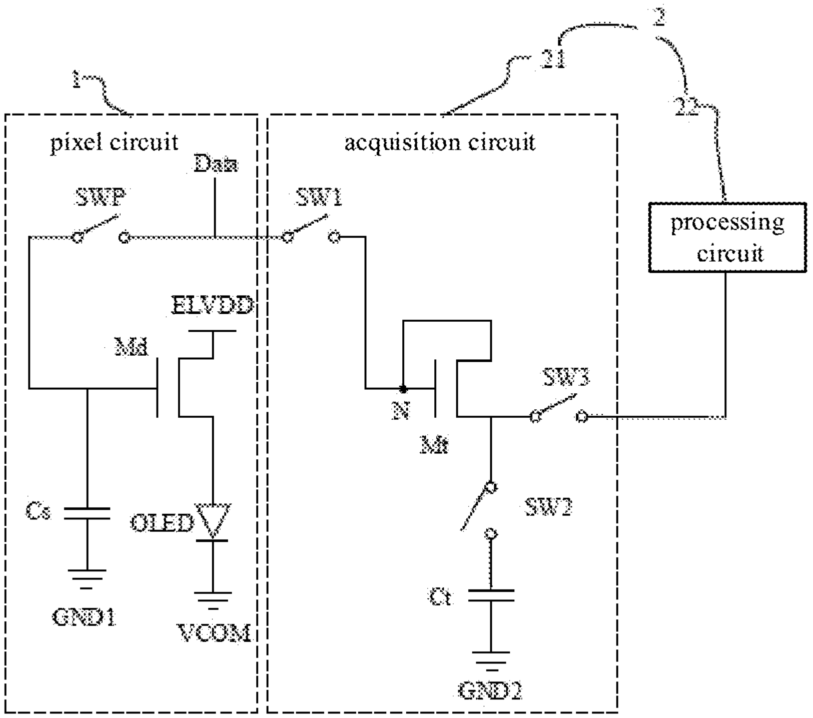
FIG. 2 is a schematic diagram of a detection circuit according to an embodiment of the disclosure.

As shown in FIG. 2, each pixel circuit 1 may be connected to a detection circuit 2, and the detection circuit 2 comprises an acquisition circuit 21 and a processing circuit 22.

The acquisition circuit 21 includes a test transistor Mt and an energy storage element Ct. A control end of the test transistor Mt is configured to be coupled to the data signal terminal Data, a first end of the test transistor Mt is configured to be written with a detection signal, and a second end of the test transistor Mt is coupled to the energy storage element Ct. A structural characteristic of the test transistor Mt and a structural characteristic of the driving transistor Md are the same.

The processing circuit 22 is coupled to the second end of the test transistor Mt, and is configured to detect a voltage at the second end of the test transistor Mt as a detection voltage, and regulate the data signal according to the detection voltage.

In the detection circuit of the disclosure, a data signal may be written into the control end of the test transistor Mt, and a detection signal may be written into the first end of the test transistor Mt, the test transistor Mt may charge the energy storage element Ct, and the voltage at the second end of the test transistor Mt is the detection voltage. Since the detection voltage is influenced by the deviation of the threshold voltage Vth of the test transistor Mt, rather than by the light-emitting element OLED of the display panel, the detection voltage may be used to reflect the deviation of the threshold voltage Vth of the test transistor Mt. Meanwhile, the structural characteristic of the test transistor Mt and the structural characteristic of the driving transistor are the same, so that the detection voltage can reflect the deviation of the threshold voltage Vth of the test transistor Mt. Thus, the data signal may be regulated according to the detection voltage to eliminate the influence of the deviation of the threshold voltage Vth on the display quality, and the situation of the color cast and black screen will be avoided, thereby improving the display quality.

It should be noted that the structural characteristic of the driving transistor Md and the structural characteristic of the test transistor Mt are the same, which means that the driving transistor Md and the test transistor Mt have the same material, the same structure and the same dimension, and thus they have the same characteristic parameters, such as threshold voltage Vth. Meanwhile, the embodiment of the disclosure is illustrated by the example that the driving transistor Md and the test transistor Mt are both N-type transistors, the first ends of which are drains, and the second ends of which are sources. However, in other embodiments of the disclosure, it is not limited thereto, the driving transistor Md and the test transistor Mt may both be P-type transistors, or may be different types of transistors, of which the source and the drain may be interchangeable.

Furthermore, in some embodiments of the disclosure, the first end of the test transistor Mt is a drain, and the second end of the test transistor Mt is a source. The first end and the control end of the test transistor Mt may be connected at the N node, that is, the gate and the drain are shorted at the N node. In this case, the test transistor Mt may be equivalent to a resistor, and the detection signal input to the first end of the test transistor Mt is the data signal. Since the resistor is directly influenced by the threshold voltage Vth of the test transistor Mt, the influence of the resistor on the signal may be used to reflect the deviation of the threshold voltage Vth. Therefore, it is possible to avoid using a special circuit to input an independent detection signal, which is beneficial to simplify the structure, and may avoid the influence on the regulation effect of the data signal due to the instability of the detection signal itself.

Furthermore, in order to facilitate control, as shown in FIG. 2, in some embodiments of the disclosure, the acquisition circuit 21 further includes a plurality of switching units. Specifically, the acquisition circuit 21 may include a first switching unit SW1, a second switching unit SW2 and a third switching unit SW3.

The first switching unit SW1 is connected between the control end of the test transistor Mt and the data signal terminal Data.

The second switching unit SW2 is connected between the second end of the test transistor Mt and the energy storage element Ct.

The third switching unit SW3 is connected between the second end of the test transistor Mt and the processing circuit 22.

The structures of the first to third switching units SW1-SW3 are not limited thereto as long as the functions of turn-off and turn-on can be realized. For example, at least one of the first to third switching units SW1-SW3 may be a transmission gate, and the detailed working principle of the structure of the transmission gate will not be described in detail here. Of course, the first to third switching units SW1-SW3 may also adopt other switching structures.

When the first switching unit SW1 is turned on, the data signal may be written into the N node, that is, input to the control end and the first end of the test transistor Mt. Meanwhile, if the second switching unit SW2 is turned on, the data signal is charged to the energy storage unit Ct via the test transistor Mt, which simulates the charging process of the storage capacitor Cs, and the charging duration may be one frame of time. If the energy storage unit Ct includes a test capacitor, the capacitance of the test capacitor may be different from the capacitance of the storage capacitor Cs. For example, the capacitance of the test capacitor is less than the capacitance of the storage capacitor Cs, so as to meet the requirements of the potential that can be recognized by the processing circuit 22. If the third switching unit SW3 is turned on, the processing circuit 22 may obtain the voltage at the second end of the test transistor Ct.

When the first switching unit SW1 is turned off, the acquisition circuit 2 cannot receive the data signal, and in this case, the detection circuit 2 does not regulate the data signal. If the second switching unit SW2 is turned off, the energy storage unit Ct cannot be charged. If the third switching unit SW3 is turned off, the processing circuit 22 cannot obtain the voltage at the second end of the test transistor Ct.

Furthermore, as shown in FIG. 2, in some embodiments of the disclosure, the energy storage element Ct may include a test capacitor, which may be coupled between the second end of the test transistor Mt and the second potential terminal GND2. As described above, when the first switching unit SW1 and the second switching unit SW2 are turned on, the data signal is charged to the test capacitor via the test transistor Mt. When the processing circuit 22 obtains the voltage at the second end of the test transistor Ct, the test capacitor may provide a stable voltage to the processing circuit 22. Meanwhile, the potential of the second potential terminal GND2 and the first potential terminal GND1 may be made the same. For example, the second potential terminal GND2 and the first potential terminal GND1 are both grounded.

The processing circuit 22 is configured to regulate the data signal according to the detection voltage to eliminate the influence of the deviation of the threshold voltage Vth on the display quality.

Figure 5:
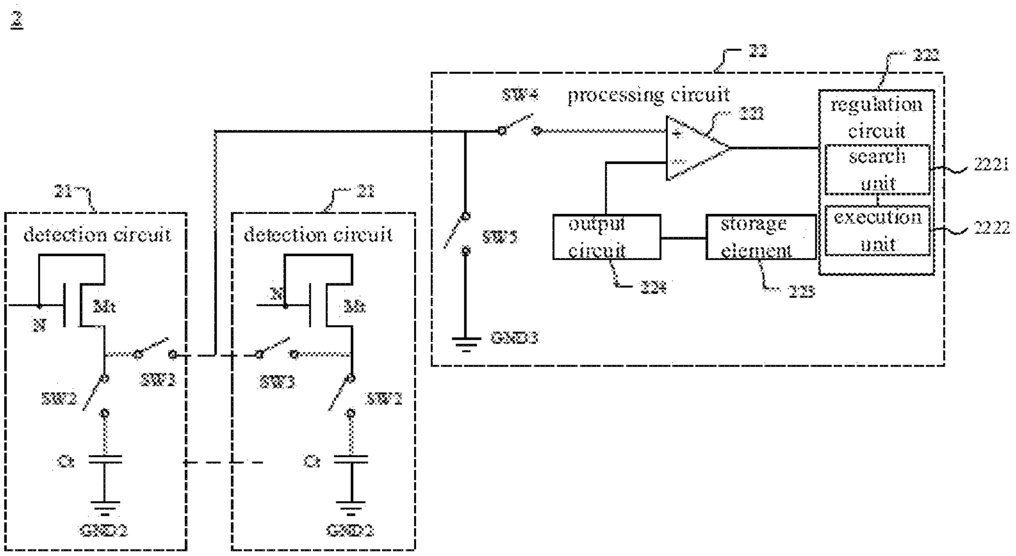
FIG. 5 is a schematic diagram of a display panel according to an embodiment of the disclosure.

As shown in FIG. 5, in some embodiments of the disclosure, the processing circuit 22 may include a comparison circuit 221 and a regulation circuit 222.

An input end of the comparison circuit 221 may be coupled to the second end of the test transistor Mt, and the voltage at the second end of the test transistor Mt may be obtained as the detection voltage. Meanwhile, a reference voltage range at which the detection voltage is located can be determined from a plurality of reference voltage ranges by the comparison circuit 221. The plurality of reference voltage ranges are different, that is, there is no overlapping interval between any two reference voltage ranges, and thus each detection voltage may only correspond to one reference voltage range at most. The comparison circuit 221 may be a comparator, and its specific type and structure are not limited thereto, as long as the voltage can be compared.

A plurality of temperature ranges beyond the threshold range may be selected, and the reference voltage range for each temperature range may be determined by test in advance. Each temperature range corresponds to one reference voltage range.

The regulation circuit 222 may be connected to an output end of the comparison circuit 221 for regulating the data signal according to a target voltage range. For example, the regulation circuit 222 may comprise a search unit 2221 and an execution unit 2222.

The search unit 2221 is connected to the comparison unit 221, and is configured to search for reference data information corresponding to the target voltage range in a predetermined mapping of reference data information as target data information according to the target voltage range.

The search unit 2221 may store or call the mapping of reference data information, which is a one-to-one mapping regarding the reference voltage range and the reference data information, that is, one reference voltage range corresponds to one piece of reference data information. Meanwhile, the reference data information may be used as a basis for regulating the data signal, and the data signal may be regenerated according to the reference data information. The reference data information about the data signal required for normal display within each reference voltage range may be determined by test in advance as the target data information, thus the corresponding target data information may be determined according to the target voltage range.

The execution unit 2222 is connected to the search unit 2221 to regulate the data signal according to the target data information.

New data signal may be generated according to the target data information to prevent the color cast and black screen. The execution unit 2222 may be connected to the data driving circuit, and the execution unit 2222 may input the new data signal to the data signal terminal Data via the data driving circuit.

Furthermore, as shown in FIG. 5, the processing circuit 22 may further include a storage element 223 and an output circuit 224.

The storage element 223 is configured to store the reference voltage range, and of course, may also store the above described mapping of reference data information. The storage element 223 may be a RAM memory (random access memory), and its specific structure, capacity and interface type, etc. are not particularly limited thereto as long as it can realize the storage function and be called. Of course, it may also be other circuit or element with a storage function.

The output circuit 224 is connected between the storage element 223 and the comparison circuit 221, and is configured to output the reference voltage range to the comparison circuit 221 and to be input with the mapping of reference data information. The specific structure of the output circuit 224 is not particularly limited thereto.

As shown in FIG. 5, in order to facilitate the control of the processing circuit 22, the processing circuit 22 may further include a fourth switching unit SW4 and a fifth switching unit SW5.

An input end of the fourth switching unit SW4 is coupled to the second end of the test transistor Mt, and an output end of the fourth switching unit SW4 is connected to the input end of the comparison circuit 221. An input end of the fifth switching unit SW5 is coupled to the input end of the fourth switching unit SW4, and an output end of the fifth switching unit SW5 is connected to a discharge terminal GND3, which may be grounded.

When the fourth switching unit SW4 is turned on and the first switching unit SW1 is turned on, the comparison circuit 221 may obtain the detection voltage at the second end of the test transistor Mt.

When the fourth switching unit SW4 is turned off, the comparison unit 221 does not obtain the detection voltage. In this case, if the third switching unit SW3 is turned on, and the fifth switching unit SW5 is turned on, the energy storage unit Ct may be discharged to the discharge terminal GND3, that is, the second end of the test transistor Mt is reset.

Figure 3:
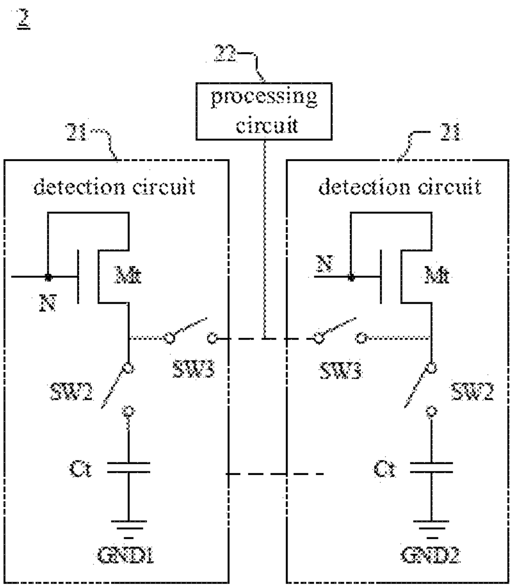
FIG. 3 is a schematic diagram of a detection circuit according to another embodiment of the disclosure.

When the temperature is too low, the voltage of the data signal used to display the low grayscale image is low, and the charge stored in the energy storage unit Ct is too low to meet the lower limit value that can be detected by the processing circuit 22, which affects the regulation of the data signal. To this end, as shown in FIG. 3, in embodiments of the disclosure, the detection circuit 2 may include at least two acquisition circuits 21, which are connected in parallel to obtain a plurality of parallel test capacitors, and in this way, the stored charge can be increased to facilitate detection by the processing circuit 22. Specifically, the second end of the test transistor Mt of each acquisition circuit 21 is connected to the processing circuit 22, and the control end of each test transistor Mt is connected to the data signal terminal Data, thus the acquisition circuits 21 are connected in parallel.

The specific number of acquisition circuits 21 is not particularly limited thereto, and may be two, three or more, as long as it can achieve a value greater than the lower limit value that can be detected by the processing circuit 22.

The disclosure provides a driving circuit for a display panel, by which a light-emitting element OLED is driven to emit light. As shown in FIGS. 2, 3, and 5, the driving circuit may include the pixel circuit 1 and the detection circuit 2 of any of the above embodiments, the specific structures and working principles of which have been described in detail above, and will not be repeated here.

The embodiments of the disclosure provide a display panel, which may include a driving circuit of any of the above embodiments. The specific structure and working principle of the driving circuit may refer to the above embodiments, and will not be repeated here.

In some embodiments of the disclosure, the display panel may include a driving backplane and a light-emitting element disposed on the driving backplane. The driving backplane may include a silicon substrate and a driving circuit arranged on the silicon substrate. Here, the pixel switching unit SWp and the first to fifth switching units SW1-SW5 are all equipped with transmission gates; the active layers, the first ends and the second ends of the transistors of each switching unit are all located in the silicon substrate; and the driving transistor Md and the test transistor Mt may be located on one side of the silicon substrate, that is, on one side of the switching units, and may be electrically connected by via holes. Therefore, the structure of the driving transistor Md may be specially designed without being limited by the internal size of the silicon substrate to obtain better performance, and since the structural characteristic of the test transistor Mt and the structural characteristic of the driving transistor M are the same, they use the same manufacturing process.

Figure 4:
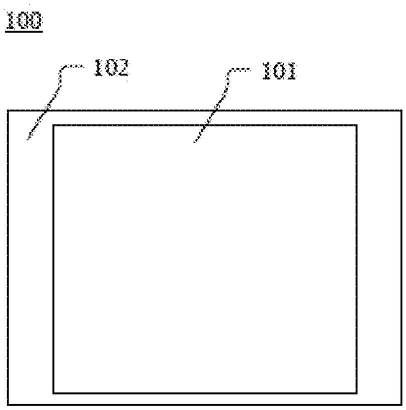
FIG. 4 is a schematic diagram of a detection circuit according to still another embodiment of the disclosure.

As shown in FIG. 4, the display panel 100 may have a display region 101 and a peripheral region 102 outside the display region 101. The pixel circuit 1 and the light-emitting element OLED may be arrayed in the display region 101, and the detection circuit 2 is located in the peripheral region 102. Since each pixel circuit 1 is connected to one detection circuit 2, and the number of detection circuits 2 is relatively large, in the peripheral region 102, the detection circuits 2 may be distributed on both sides of the display region 101. Of course, other distribution may also be used.

Figure 6:
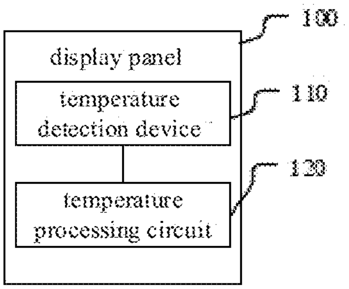
FIG. 6 is a schematic diagram of a temperature detection device and a temperature processing circuit in a display panel according to an embodiment of the disclosure.

In order to facilitate the detection of the ambient temperature and determine the working timing of the detection circuit 2, as shown in FIG. 6, the display panel may further include a temperature detection device 110 and a temperature processing circuit 120.

The temperature detection device 110 may be configured to detect a temperature of the environment where the driving circuit is located to obtain a detection temperature. The temperature detection device 110 may be a temperature sensor, and its specific location and type are not particularly limited thereto.

The temperature processing circuit 120 is connected to the temperature detection device 110 to receive the detection temperature and compare the detection temperature with the threshold range. When the detection temperature is beyond the threshold range, the pixel switching unit SWp is controlled to be turned off and output a detection signal. After the detection circuit 2 receives the detection signal, the data signal may be regulated. That is, the detection circuit 2 may regulate the data signal only when the temperature of the environment in which the driving circuit is located is too high or too low. The specific principle of the regulation may refer to the implementation of the detection circuit 2 above, which will not be repeated here.

The disclosure also provides a method for driving the display panel. The specific structure of the display panel has been described in detail above, and reference may be made to the above embodiments, which will not be repeated here.

Figure 7:
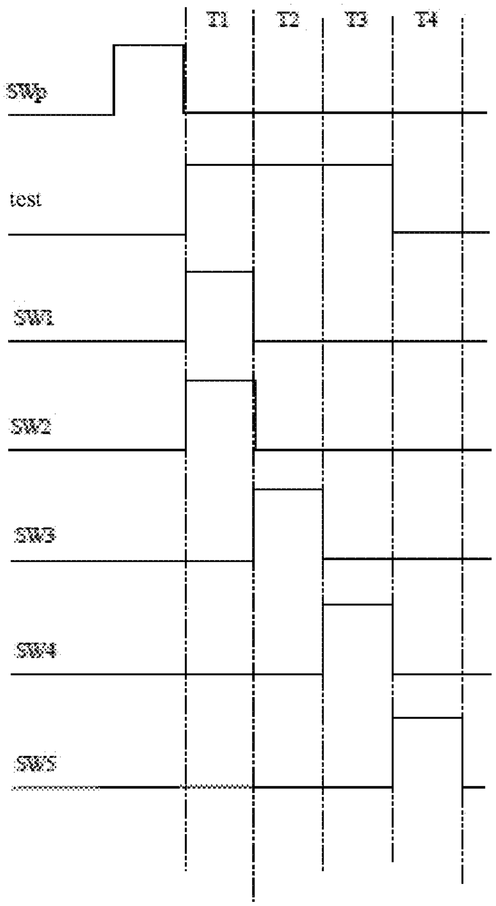
FIG. 7 is a timing diagram of a driving method according to an embodiment of the disclosure.

As shown in FIG. 7, the driving method of the disclosure may include the following steps.

In a display phase T1, the pixel switching unit SWp is turned on and the first switching unit SW1 is turned off.

In the display phase T1, the pixel circuit 1 receives the data signal, and the detection circuit 2 does not detect the voltage at the second end of the test transistor Mt.

In a detection phase T2, the pixel switching unit SWp and the third switching unit SW3 are turned off, and the first switching unit SW1 and the second switching unit SW2 are turned on.

After receiving the detection signal (denoted as "test"), the driving circuit enters the detection phase T2. At this time the pixel circuit 1 no longer receives the data signal, and the detection circuit 2 receives the data signal and charges the energy storage element Ct.

In a regulation phase T3, the third switching unit SW3 is turned on, and the pixel switching unit SWp and the first switching unit SW1 are turned off. The processing circuit 22 detects the voltage at the second end of the test transistor Mt as the detection voltage, and regulates the data signal according to the detection voltage.

Furthermore, the driving method of the disclosure may further include the following steps.

In the regulation phase T3, the second switching unit SW2 and the fourth switching unit SW4 are turned on, and the fifth switching unit SW5 is turned off.

In a discharge phase T4, the second switching unit SW2, the third switching unit SW3 and the fifth switching unit SW5 are turned on, and the first switching unit SW1 and the fourth switching unit SW4 are turned off, so that the test capacitor Mt is discharged to the discharge terminal GND3.

In FIG. 7, each switching unit is turned on at a high level and turned off at a low level, but FIG. 7 only schematically shows the timing of each switching unit, and is not limited to the specific waveform of the actual driving signal. Those skilled in the art may know that when each switching unit is a transmission gate or other circuit, the driving signal may change accordingly, but the sequence of turn-on and turn-off of each switching unit still consistent with the sequence in FIG. 7.

It should be noted that although the various steps of the driving method in this disclosure are described in a specific order in the drawings, this does not require or imply that these steps must be performed in the specific order, or that all these steps must be performed to achieve the desired result. Additionally or alternatively, certain steps may be omitted, multiple steps may be combined into one step for execution, and/or one step may be decomposed into multiple steps for execution, and so on.

Other embodiments of the disclosure will be easily obtained by those skilled in the art upon consideration of the specification and practice of the disclosure herein. This application is intended to cover any variation, use, or adaptation of the disclosure that follows the general principles of the disclosure and include common knowledge or techniques in the technical field not disclosed by the disclosure. The specification and embodiments are regarded as illustrative only, with the scope and spirit of the disclosure being indicated by the appended claims.

What is claimed is:

1. A detection circuit for a pixel circuit, wherein the pixel circuit comprises a driving transistor, and a pixel switching unit connected between a control end of the driving transistor and a data signal terminal, the data signal terminal being configured to provide a data signal; and the detection circuit comprises:

an acquisition circuit comprising a test transistor and an energy storage element, wherein a control end of the test transistor is configured to be coupled to the data signal terminal, a first end of the test transistor is configured to be written with a detection signal, and a second end of the test transistor is coupled to the energy storage element; and a structural characteristic of the test transistor is identical to a structural characteristic of the driving transistor; and a processing circuit coupled to the second end of the test transistor, and configured to detect a voltage at the second end of the test transistor as a detection voltage and regulate the data signal according to the detection voltage;

wherein the acquisition circuit further comprises:

a first switching unit connected between the control end of the test transistor and the data signal terminal;

a second switching unit connected between the second end of the test transistor and the energy storage element; and a third switching unit connected between the second end of the test transistor and the processing circuit.

2. The detection circuit according to claim 1, wherein the first end of the test transistor is connected to the control end of the test transistor, and the detection signal is the data signal.

3. The detection circuit according to claim 1, wherein the pixel circuit further comprises:

a storage capacitor connected between the data signal terminal and a first potential terminal, and between the control end of the driving transistor and the first potential terminal; and wherein the energy storage element comprises:

a test capacitor coupled between the second end of the test transistor and a second potential terminal.

4. The detection circuit according to claim 3, wherein a potential at the first potential terminal is identical to a potential at the second potential terminal.

5. The detection circuit according to claim 1, wherein the processing circuit comprises:

a comparison circuit of which an input end is coupled to the second end of the test transistor, configured to determine, within a plurality of reference voltage ranges, a reference voltage range at which the detection voltage is located, as a target voltage range; and a regulation circuit connected to an output end of the comparison circuit and configured to regulate the data signal according to the target voltage range.

6. The detection circuit according to claim 5, wherein the regulation circuit is further configured to:

search for reference data information corresponding to the target voltage range in a predetermined mapping of reference data information as target data information according to the target voltage range; and regulate the data signal according to the target data information.

7. The detection circuit according to claim 5, wherein the processing circuit further comprises:

a memory configured to store the reference voltage range; and an output circuit connected between the storage element and the comparison circuit, and configured to output the reference voltage range to the comparison circuit.

8. The detection circuit according to claim 1, wherein the processing circuit further comprises:

a fourth switching unit coupled between the second end of the test transistor and an input end of a comparison circuit; and a fifth switching unit coupled between the input end of the comparison circuit and a discharge terminal.

9. The detection circuit according to claim 1, wherein at least two acquisition circuits are provided, and in each acquisition circuit of the at least two acquisition circuits, the second end of the test transistor is connected to the processing circuit, and the control end of the test transistor is connected to the data signal terminal.

10. A driving method for a display panel, wherein the display panel comprises:

a driving circuit comprising the pixel circuit and the detection circuit according to claim 1; and wherein the driving method includes:

in a display phase, turning on the pixel switching unit, and turning off the first switching unit;

in a detection phase, turning off the pixel switching unit and the third switching unit, and turning on the first switching unit and the second switching unit; and in a regulation phase, turning on the second switching unit and the third switching unit, and turning off the pixel switching unit and the first switching unit; detecting, by the processing circuit, the voltage at the second end of the test transistor, as the detection voltage, and regulating the data signal according to the detection voltage.

11. The driving method according to claim 10, wherein the processing circuit comprises:

a comparison circuit of which an input end is coupled to the second end of the test transistor, configured to determine, within a plurality of reference voltage ranges, a reference voltage range at which the detection voltage is located, as a target voltage range;

a regulation circuit connected to an output end of the comparison circuit, and configured to regulate the data signal according to the target voltage range;

a fourth switching unit coupled between the second end of the test transistor and the input end of the comparison circuit; and a fifth switching unit coupled between the input end of the comparison circuit and a discharge terminal; and wherein the driving method further comprises:

in the regulation phase, turning on the fourth switching unit and turning off the fifth switching unit; and in a discharge phase, turning on the second switching unit, the third switching unit and the fifth switching unit, and turning off the first switching unit and the fourth switching unit, enabling the energy storage element to discharge to the discharge terminal.

12. The driving method according to claim 10, wherein the display panel further comprises:

a temperature sensor configured to detect a temperature of an environment in which the driving circuit is located to obtain a detection temperature; and a temperature processing circuit configured to control, in response to the detection temperature outside a threshold range, the pixel switching unit to be turned off and output a detection signal to the detection circuit; and wherein the driving method further includes:

entering the detection phase after the driving circuit receiving the detection signal.

13. A driving circuit, comprising:

a pixel circuit comprising a driving transistor, and a pixel switching unit connected between a control end of the driving transistor and a data signal terminal, the data signal terminal being configured to provide a data signal; and a detection circuit comprising:

an acquisition circuit comprising a test transistor and an energy storage element, wherein a control end of the test transistor is configured to be coupled to the data signal terminal, a first end of the test transistor is configured to be written with a detection signal, and a second end of the test transistor is coupled to the energy storage element; and a structural characteristic of the test transistor is identical to a structural characteristic of the driving transistor; and a processing circuit coupled to the second end of the test transistor, and configured to detect a voltage at the second end of the test transistor as a detection voltage and regulate the data signal according to the detection voltage;

wherein the acquisition circuit further comprises:

a first switching unit connected between the control end of the test transistor and the data signal terminal;

a second switching unit connected between the second end of the test transistor and the energy storage element; and a third switching unit connected between the second end of the test transistor and the processing circuit.

14. A display panel, comprising the driving circuit according to claim 13.

15. The display panel according to claim 14, having a display region and a peripheral region outside the display region;

wherein the pixel circuit is in the display region, and the detection circuit is in the peripheral region.

16. The display panel according to claim 14, comprising:

a temperature sensor configured to detect a temperature of an environment in which the driving circuit is located to obtain a detection temperature; and a temperature processing circuit configured to control the pixel switching unit to be turned off in response to the detection temperature outside a threshold range, and output a detection signal to the detection circuit.

17. The driving circuit according to claim 13, wherein the first end of the test transistor is connected to the control end of the test transistor, and the detection signal is the data signal.

18. The driving circuit according to claim 13, wherein the pixel circuit further comprises:

a storage capacitor connected between the data signal terminal and a first potential terminal, and between the control end of the driving transistor and the first potential terminal; and wherein the energy storage element comprises:

a test capacitor coupled between the second end of the test transistor and a second potential terminal.

* * * * *